May 3, 1960  G. RUSCHE  2,935,651
CONSTANT SPEED DEVICE
Filed July 6, 1955
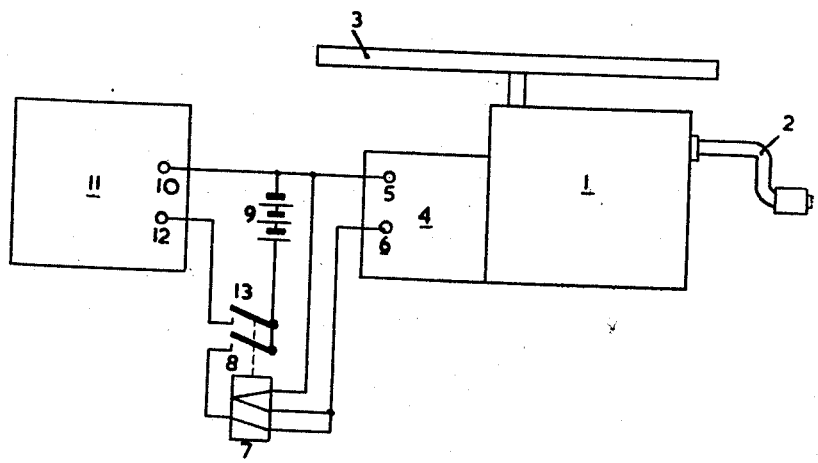
INVENTOR
GEORG RUSCHE
BY
AGENT

United States Patent Office 2,935,651
Patented May 3, 1960

2,935,651
CONSTANT SPEED DEVICE

Georg Rusche, Hamburg, Germany, assignor, by mesne assignments, to North American Philips Company, Inc., New York, N.Y., a corporation of Delaware Application July 6, 1955, Serial No. 520,238

Claims priority, application Germany September 29, 1954

9 Claims. (Cl. 317—5)

The present invention relates to a constant speed device. More particularly, the invention relates to a device for driving a record turntable at substantially stabilized speed.

Reference has been made to the fact that the energy for an electric apparatus, more particularly, for the amplifier of a record player or a magnetic recording and reproducing device may be obtained by causing the winding timing mechanism provided for driving the record or the magnetic tape to drive, in addition, an electric generator. However, in practice it is found that, compared with the force to be furnished by hand for winding up the timing mechanism or clockwork and with the speed, a multiple of the playing time of a record or a magnetic tape is required to store the mechanical energy necessary for the desired playing time in said mechanism, when considering the effective conversion of energy. It is therefore necessary to restrict the losses of energy as far as possible.

It has been found that an important portion of the energy is lost in the speed control of such a device, particularly if use is made of a centrifugal brake.

In accordance with the invention, an apparatus comprising a timing mechanism (clockwork) or the like driving an electric generator, more particularly, a record player or a magnetic recording and reproducing device, in which the conversion takes place in a very effective manner by means of the generator, is obtained, if the generator feeds means for storing electric energy and is used for the control of the speed preferably for keeping the speed constant.

From the beginning the clockwork, when it has a high torque, is controlled to the desired speed, since a correspondingly higher current, which exceeds the required useful current, is produced by the generator and supplied to the energy storing means. When the clockwork subsequently unwinds to an extent such that it furnishes only a small current, which is lower than the useful current, the electrical energy storing means takes over the supply of the difference current. Thus the important loss of energy due to braking is avoided, while the speed is controlled and more particularly, substantially kept constant.

It is advantageous to provide the generator with a permanent magnet to produce the main field, so that the supply of electrical energy for producting this magnetic field is economized. It is efficient to cause the field produced by the permanent magnet to be varied for the adjustment of the desired speed, for example by means of a slidable magnetic shunt.

Since any connected electric apparatus, more particularly, a tube amplifier or a transistor amplifier, requires direct-voltage supply and since the speed of a record or of a magnetic tape must remain at least approximately constant, it is efficient to choose a direct-voltage dynamo as a generator, the voltage of which increases at an increase in speed and to use a direct-current storage cell or battery with a substantially constant terminal voltage.

If the speed tends to increase, the generator voltage increases and a correspondingly stronger current is supplied to the storage cell, so that a higher load and thus a constant speed is obtained.

The speed may be kept constant in a very satisfying manner, if use is made of a direct-voltage dynamo, in which, for example owing to the use of an auxiliary energizing winding fed by the load current, the voltage is substantially independent of the load current and preferably even increases with the load current. It is thus achieved that a high load current, for example at the beginning of the unwinding of the timing mechanism does not substantially effect the speed.

Since it is difficult in practice to manufacture a direct-current storage means, for example, a dry battery or, preferably a gas-tight battery, being sufficiently compact and being able to furnish comparatively high voltages, a device according to the invention is very advantageous, if it is combined with an electrical load requiring comparatively low voltages, for example owing to the use of transistors. However, also if tubes are applied, the invention provides advantages without the need for storing high voltages, if the electric generator driven by the timing mechanism supplies only the heating current, the anode voltage being obtained, however, from a particular supply, for example, a dry battery or conversely. Thus large part of the required energy is furnished by mechanical force, which provides a reduction in operational expenses and an improvement in reliable operation.

The dimensions of the energy storage means itself need be suitable only for the conversion of energy during one operational period of the timing mechanism (charge and discharge). However, it may be advantageous to have a larger-sized storage means and to provide it, if desired, with an additional charging device, for example by a power supply line connection. Then the energy storage means itself is capable of feeding the load, for example an amplifier or the like even without the use of the electric generator.

However, owing to the connection with the generator, the discharge time is considerably increased and, as the case may be, the average discharge voltage of the battery is also stabilized.

The invention will now be described more fully with reference to the accompanying drawing.

A timing mechanism 1, which can be wound up by means of a handle 2, drives a record turntable or player 3. Coupled to the timing mechanism 1, for example, by way of a cog-wheel gearing, is a direct-voltage generator 4, which during the operation furnishes a voltage approximately proportional to the speed and obtainable from the terminals 5 and 6. With the terminals 5 and 6 is connected the voltage winding of a switching relay 7. Moreover a conduit from the terminal connects a current winding of the relay 7, via a working contact 8, with the positive terminal of storage battery 9, the negative terminal of which is connected with the terminal 5 of the generator and the terminal 10 of a user 11, for example a transistor amplifier. Another terminal 12 of the load 11 can be connected via a working contact 13 of the relay 7 also with the positive terminal of the battery 9.

When the timing mechanism 1 is wound up and when the turntable 3 is set moving, the terminals 5 and 6 exhibit a voltage. As soon as this voltage has reached a minimum value determined by the dimensions of the voltage winding of the relay 7 and preferably corresponding approximately to the voltage of the battery 9, the relay 7 is energized and connects the battery both to the generator 4 and to the load 11. The load, which may be a reproducing amplifier for the oscillations of a pick-up (not shown) is thus made operative and a loudspeaker is energized.

At first the torque of the timing mechanism is comparatively high and a strong current is produced, which, as long as it is not supplied to the load, is absorbed by the storage battery 9 (for example having a terminal voltage of about 10 to 20 v.). At the termination of the operational period the timing mechanism 1 has only a comparatively small torque and produces only a low current. Any energy which may be required in addition by the load is then obtained from the battery 9. The latter is thus first charged and then discharged during one or more playing periods, whilst, owing to the relationship of the terminal voltage of the generator and the speed and owing to the small variation of the terminal voltage of the battery 9 the speed is kept at least substantially constant during such a sequence of charges and discharges.

When the timing mechanism is unwound or when it has been stopped and the voltage produced by the generator is lower than that of the battery 9, the current winding of the relay 7 is traversed by a feed-back current (in a direction opposite to that of the current first produced), so that the magnetic field of the relay is attenuated and the armature falls off and the contacts 8 and 13 are opened.

It may be advantageous to separate the contact 13, by which the load is switched on, from the charging contact 8, and to use for the latter, for example, a rectifier, preferably a dry rectifier or a crystal rectifier, if desired, a germanium diode; the contact 13 may be replaced by a switch to be operated manually. This is especially to be preferred, if the amplifier, which may for example comprise also a radio receiver, is to be operated even if the timing mechanism is not in operation.

The connection of the generator 4 to the storage battery 9 may be established also by means of a mechanically driven member, for example a centrifugal switch. Provisions must only be made that with an inoperative generator or with a generator operating to a small extent no current flows back from the battery to the generator and would thus be consumed uselessly.

What is claimed is:

1. Apparatus comprising a member adapted to be driven at a substantially constant speed, means for driving said member, electrical generating means mechanically coupled to said driving means and driven by the said driving means, said generating means having an output terminal at which the output voltage thereof is produced, means for storing electrical energy derived from said generating means, said electrical energy storing means having a substantially constant terminal voltage and means electrically coupling said storing means and said output terminal in a manner whereby upon an increase in speed of said driving member a correspondingly greater current is supplied to the said energy storing means and a correspondingly greater load appears at said output terminal.

2. Apparatus comprising a member adapted to be driven at a substantially constant speed, means for driving said member, electrical generating means mechanically coupled to said driving means and driven by the said driving means, said generating means having a pair of output terminals across which the output voltage thereof is produced, a load having a pair of input terminals, means for storing electrical energy derived from said generating means, said electrical energy storing means having a substantially constant terminal voltage, means electrically connecting one terminal of said energy storing means between one of said output terminals and one of said input terminals whereby upon an increase in speed of said driving member a correspondingly greater current is supplied to the said energy storing means and a correspondingly greater load appears at said one output terminal and means responsive to a predetermined magnitude of said output voltage electrically connecting the other terminal of said energy storing means between the other of said output terminals and the other of said input terminals whereby upon a decrease in speed of said driving member, a correspondingly smaller current is supplied to the said energy storing means and the said energy storing means supplies correspondingly additional energy to said load.

3. Apparatus comprising a member adapted to be driven at a substantially constant speed, means for driving said member, electrical generating means mechanically coupled to said driving means and driven by the said driving means, said generating means comprising a permanent magnet for producing the main field thereof, means for varying the field produced by said magnet in a manner whereby the speed of the said generating means is varied and an output terminal at which the output voltage thereof is produced, means for storing electrical energy derived from said generating means, said electrical energy storing means having a substantially constant terminal voltage and means electrically coupling said storing means and said output terminal in a manner whereby upon an increase in speed of said driving member a correspondingly greater current is supplied to the said energy storing means and a correspondingly greater load appears at said output terminal.

4. Apparatus comprising a member adapted to be driven at a substantially constant speed, means for driving said member, electrical generating means mechanically coupled to said driving means and driven by the said driving means, said generating means comprising a direct voltage generator having an output terminal at which the output voltage thereof is produced, said output voltage increasing with increasing speed of said generator and at the minimum speed being substantially independent of the current in a load thereon and increasing with said last-mentioned current, means for storing electrical energy derived from said generating means, said electrical energy storing means having a substantially constant terminal voltage and means electrically coupling said storing means and said output terminal in a manner whereby upon an increase in speed of said driving member a correspondingly greater current is supplied to the said energy storing means and a correspondingly greater load appears at said output terminal.

5. Apparatus comprising a member adapted to be driven at a substantially constant speed, means for driving said member, electrical generating means mechanically coupled to said driving means and driven by the said driving means, said generating means having an output terminal at which the output voltage thereof is produced, means for storing electrical energy derived from said generating means, said electrical energy storing means comprising a dry cell having a substantially constant terminal voltage and means electrically coupling said storing means and said output terminal in a manner whereby upon an increase in speed of said driving member a correspondingly greater current is supplied to the said energy storing means and a correspondingly greater load appears at said output terminal.

6. Apparatus comprising a member adapted to be driven at a substantially constant speed, means for driving said member, electrical generating means mechanically coupled to said driving means and driven by the said driving means, said generating means having an output terminal at which the output voltage thereof is produced, means for storing electrical energy derived from said generating means, said electrical energy storing means comprising a gas-tight storage battery having a substantially constant terminal voltage and means electrically coupling said storing means and said output terminal in a manner whereby upon an increase in speed of said driving member a correspondingly greater current is supplied to the said energy storing means and a correspondingly greater load appears at said output terminal.

7. Apparatus comprising a member adapted to be driven at a substantially constant speed, means for driving said member, electrical generating means mechanically coupled to said driving means and driven by the said driving means, said generating means having a pair of output terminals across which the output voltage thereof is produced, a load having a pair of input terminals, means for storing electrical energy derived from said generating means, said electrical energy storing means having a substantially constant terminal voltage, means electrically connecting one terminal of said energy storing means between one of said output terminals and one of said input terminals whereby upon an increase in speed of said driving member a correspondingly greater current is supplied to the said energy storing means and a correspondingly greater load appears at said one output terminal and means responsive to a predetermined magnitude of said output voltage electrically coupling the other terminal of said energy storing means between the other of said output terminals and the other of said input terminals whereby upon a decrease in speed of said driving member a correspondingly smaller current is supplied to the said energy storing means and the said energy storing means supplies correspondingly additional energy to said load, said last mentioned means including a rectifier interposed between said other terminal of said energy storing means and said other output terminal.

8. Apparatus comprising a member adapted to be driven at a substantially constant speed, means for driving said member, electrical generating means mechanically coupled to said driving means and driven by the said driving means, said generating means having a pair of output terminals across which the output voltage thereof is produced, a load comprising an amplifier having a pair of input terminals, means for storing electrical energy derived from said generating means, said electrical energy storing means having a substantially constant terminal voltage, means electrically connecting one terminal of said energy storing means between one of said output terminals and one of said input terminals whereby upon an increase in speed of said driving member a correspondingly greater current is supplied to the said energy storing means and a correspondingly greater load appears at said one output terminal and relay means responsive to a predetermined magnitude of said output voltage electrically connecting the other terminal of said energy storing means between the other of said output terminals and the other of said input terminals whereby upon a decrease in speed of said driving member a correspondingly smaller current is supplied to the said energy storing means and the said energy storing means supplies correspondingly additional energy to said load.

9. Apparatus comprising a member adapted to be driven at a substantially constant speed, means for driving said member, electrical generating means mechanically coupled to said driving means and driven by the said driving means, said generating means having a pair of output terminals across which the output voltage thereof is produced, a load comprising an amplifier having a pair of input terminals, means for storing electrical energy derived from said generating means, said electrical energy storing means having a substantially constant terminal voltage, means electrically connecting one terminal of said energy storing means between one of said output terminals and one of said input terminals whereby upon an increase in speed of said driving member a correspondingly greater current is supplied to the said energy storing means and a correspondingly greater load appears at said one output terminal and mechanically operated switching means responsive to a predetermined magnitude of said output voltage electrically connecting the other terminal of said energy storing means between the other of said output terminals and the other of said input terminals whereby upon a decrease in speed of said driving member a correspondingly smaller current is supplied to the said energy storing means and the said energy storing means supplies correspondingly additional energy to said load.

References Cited in the file of this patent

UNITED STATES PATENTS

| 474,008 | Gibboney | May 3, 1892 |
| 1,796,183 | Anderson | Mar. 10, 1931 |

FOREIGN PATENTS

| 821,125 | Germany | Nov. 15, 1951 |